(12) United States Patent
Kaur et al.

(10) Patent No.: US 11,409,931 B1
(45) Date of Patent: Aug. 9, 2022

(54) SYSTEMS AND METHODS FOR OPTIMIZING SCAN PIPELINING IN HIERARCHICAL TEST DESIGN

(71) Applicant: CADENCE DESIGN SYSTEMS, INC., San Jose, CA (US)

(72) Inventors: Jagjot Kaur, Milpitas, CA (US); William Scott Gaskins, Durham, NC (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/203,497

(22) Filed: Mar. 16, 2021

(51) Int. Cl.
  *G06F 30/333* (2020.01)
  *G06F 30/30* (2020.01)
  *G06F 30/32* (2020.01)
  *G06F 30/396* (2020.01)
  *G06F 119/12* (2020.01)
  *G01R 31/3185* (2006.01)
  *G01R 31/317* (2006.01)

(52) U.S. Cl.
  CPC ............ *G06F 30/333* (2020.01); *G06F 30/32* (2020.01); *G01R 31/31704* (2013.01); *G01R 31/318552* (2013.01); *G01R 31/318583* (2013.01); *G06F 30/396* (2020.01); *G06F 2119/12* (2020.01)

(58) Field of Classification Search
  None
  See application file for complete search history.

(56) References Cited

U.S. PATENT DOCUMENTS

| | | | |
|---|---|---|---|
| 6,106,568 A * | 8/2000 | Beausang | G01R 31/31704 716/102 |
| 7,373,568 B1 * | 5/2008 | Horovitz | G01R 31/318594 714/726 |
| 9,262,359 B1 * | 2/2016 | Noice | G06F 30/392 |
| 9,535,120 B2 * | 1/2017 | Ren | G01R 31/318547 |
| 10,372,858 B2 * | 8/2019 | Odiz | G06F 30/327 |
| 2003/0149926 A1 * | 8/2003 | Rajan | G01R 31/318536 714/726 |
| 2008/0066040 A1 * | 3/2008 | Taylor | G06F 30/30 716/139 |
| 2011/0066987 A1 * | 3/2011 | Handa | G06F 30/327 716/104 |

* cited by examiner

*Primary Examiner* — Leigh M Garbowski
(74) *Attorney, Agent, or Firm* — Foley & Lardner LLP

(57) ABSTRACT

A system for optimizing scan pipelining may include a processor and a memory. The processor may generate and insert, based on prior analysis of the physical layout of the circuit, an optimized number of pipeline stages between a first block and a second block in a hardware test design, a first scan chain including at least one pipeline stage of a head pipeline stage or a tail pipeline stage. The processor may insert a plurality of flip-flops into the first scan chain. The processor may determine at least one clock to be used for the at least one pipeline stage, using the plurality of flip-flops so as to eliminate the need of a lockup element between the at least one pipeline stage and the plurality of flip-flops. The processor may generate, based on the at least one clock, a second scan chain that connects the at least one pipeline stage and the plurality of flip-flops.

20 Claims, 13 Drawing Sheets

| Row | Launching Scan Bit | Capturing Scan Bit | Lockup Needed | Latch Allowed | Flop Allowed |
|---|---|---|---|---|---|
| 1 | Fall | Rise | No | High Latch | PosEdge Flop |
| 2 | Fall | Fall | When clocks are different | Low Latch | PosEdge Flop |
| 3 | Rise | Rise | When clocks are different | No | PosEdge Flop |
| 4 | Rise | Fall | Yes | | |

Fig. 5

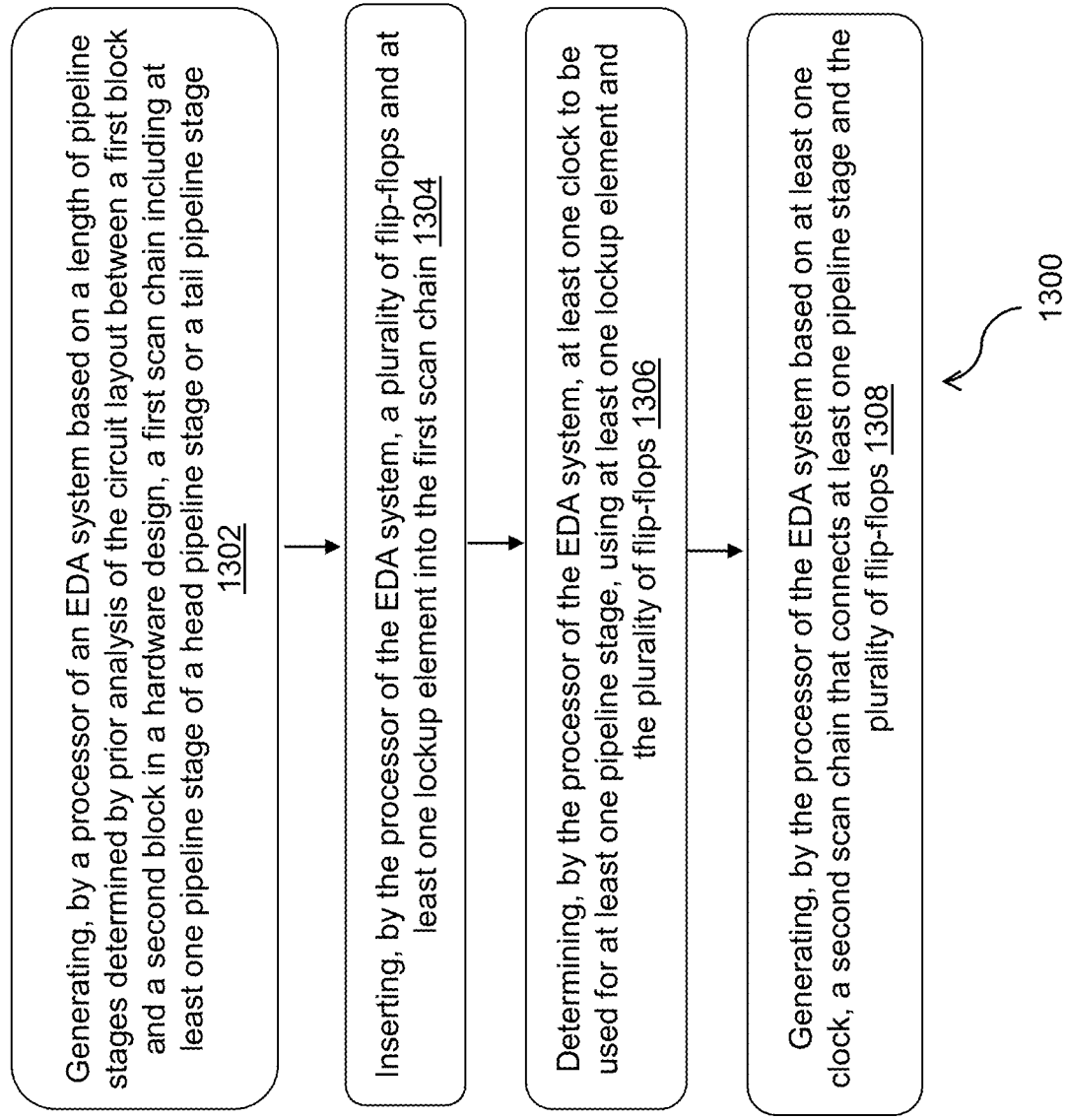

SYSTEMS AND METHODS FOR OPTIMIZING SCAN PIPELINING IN HIERARCHICAL TEST DESIGN

TECHNICAL FIELD

This application is generally directed towards electronic design automation (EDA), and to systems, methods, devices, and instructions for integrating circuit designs and more specifically towards systems and methods for reducing an area overhead in design for testing (DFT) by optimizing scan pipelining in a hierarchical test design.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based EDA tools for synthesis, debugging, and functional verification of the ICs. An EDA system can automate the design and test processes of verifying the correctness of an electronic system against the specifications of the electronic system through various synthesis and verification steps. An EDA system can also test a manufactured electronic system to ensure that it meets the specifications and/or quality requirements of the electronic system. The electronic system may include an IC or a printed circuit board (PCB). The IC may be a system-on-chip (SOC), application-specific integrated circuit (ASIC), or a field programmable gate array (FPGA). h An EDA system can apply design for testing or design for testability (DFT) to add testability features to a hardware product design so as to validate the product's correct functioning, e.g., validating that the product hardware contains no manufacturing defects. In applying DFT techniques to an IC chip, scan chain techniques can be used to set and observe every flip-flop in an IC. For example, the first flop of a scan chain is connected to an input port (scan-in port) and the last flop is connected to an output port (scan-out port). A scan chain operation can include scan-in, scan-capture and scan-out. In the scan-in stage, all the flip-flops can be shifted in and loaded with a sequence, like a shift register. Once the sequence is loaded, one clock pulse (capture pulse) can excite a combinatorial logic block and the output can be captured at the second flop. The output data is then shifted out in the scan-out stage. In some design, lockup elements may be inserted between flops to get rid of timing problems arising due to either of uncontrolled clock skew or uncommon clock path.

In applying DFT techniques to an IC chip, as design sizes continue to grow larger, more and more networks (also called "nets" which is a collection of two or more interconnected components) and buses have to travel long distances across the chip. Faster clock speeds would make it difficult to meet cycle times as timing requirements, even when these networks are optimized with buffers placed in optimal locations along their path. When the cycle time cannot be met, pipeline flip-flops (PFFs) can be inserted along a network to achieve the timing requirements. There is a need for a mechanism to efficiently insert PFFS to meet timing requirements.

System on a chip (SOC) designs are gaining complexity and size, facing many challenges. One of the challenges is how to implement DFT testability features to optimize tool runtime, capacity, and/or capability. An optimal approach is to be able to process and work on design cores independently in a flow and use their leverage in processing downstream in the flow. For example, reuse of a block or core across multiple projects has become a standard design practice that can significantly reduce time and effort to tape out an SOC. This hierarchical test design approach can involve completing synthesis, static timing analysis (STA) and physical design (PD) on lower-level blocks. In a hierarchical test design, DFT insertion can be done for each of the lower-level blocks and a bottom-up synthesis approach can be followed. For example, the lower-level blocks then can be instantiated and used for higher-level blocks' synthesis. After lower-level blocks are synthesized, DFT can be inserted in a next higher-level block. In a hierarchical test design, a higher-level hierarchical block may be physically distant from lower-level blocks. There is a need for a mechanism to optimize the network connections between the distant blocks in a hierarchical test design.

SUMMARY

Embodiments of the present disclosure relate to system and method for reducing an area overhead in DFT by optimizing scan pipelining in a hierarchical test design.

In an embodiment, a method of optimizing scan pipelining in an EDA system comprises generating, by a processor, based on a required length of pipeline stages between a first block and a second block in a hardware test design, a first scan chain including at least one pipeline stage of a head pipeline stage or a tail pipeline stage; inserting, by the processor, a plurality of pipeline flip-flops into the scan chain; determining, by the processor, at least one clock to be used for at least one pipeline stage, using the plurality of flip-flops; and generating, by the processor, based on at least one clock, a second scan chain that connects at least one pipeline stage and the plurality of flip-flops.

In another embodiment, a system for optimizing scan pipelining comprises a memory containing instructions; and a processor configured to execute the instructions to: generate, based on a length of pipeline stages between a first block and a second block in a hardware test design, a first scan chain including at least one pipeline stage of a head pipeline stage or a tail pipeline stage; insert a plurality of flip-flops into the first scan chain; determine at least one clock to be used for at least one pipeline stage, using the plurality of flip-flops; and generate, based on at least one clock, a second scan chain that connects at least one pipeline stage and the plurality of flip-flops.

BRIEF DESCRIPTION OF THE DRAWINGS

The accompanying drawings constitute a part of this specification and illustrate an embodiment of the subject matter described herein.

FIG. 5 is a table showing cases which require lockup elements along with type of the required lockup element.

FIG. 13 is a flowchart illustrating an example methodology for optimizing scan pipelining in a hierarchical test design, according to some embodiments.

DETAILED DESCRIPTION

Embodiments disclosed herein describe a system for optimizing scan pipelining may include a processor and a memory. The processor may generate, based on a length of pipeline stages between a first block and a second block in a hardware test design, a first scan chain including at least one pipeline stage of a head pipeline stage or a tail pipeline stage. The processor may insert a plurality of flip-flops and at least one lockup element into the first scan chain, determine at least one clock to be used for at least one pipeline stage, using at least one lockup element and the plurality of flip-flops, and generate, based on at least one clock, a second scan chain that connects at least one pipeline stage and the plurality of flip-flops. With this configuration, the system can (1) select correct or optimal clocking necessary for each pipeline stage inserted along a network in a hardware design, thereby satisfying timing requirements for a high scan shift frequency and/or (2) insert an optimal number of pipeline stages in a hierarchical test design, thereby reducing the DFT overhead in an integrated circuit design.

One problem relating to applying DFT techniques is how to insert PFFs along a network to achieve timing requirements. Conventionally, in applying DFT techniques, when the cycle time as timing requirements cannot be met, PFFs can be manually inserted along a network to achieve the timing requirements. However, as the number of networks (or nets) requiring PFFs grows, it is unrealistic to insert them manually. While there are techniques in place and route (PnR) tools to analyze the design to determine the number of PFFs required, insertion of pipelines still needs to take place either in register-transfer level (RTL) or in a synthesis tool. Moreover, selecting the correct clocking for the pipeline stages remains a design challenge.

Figure 1:
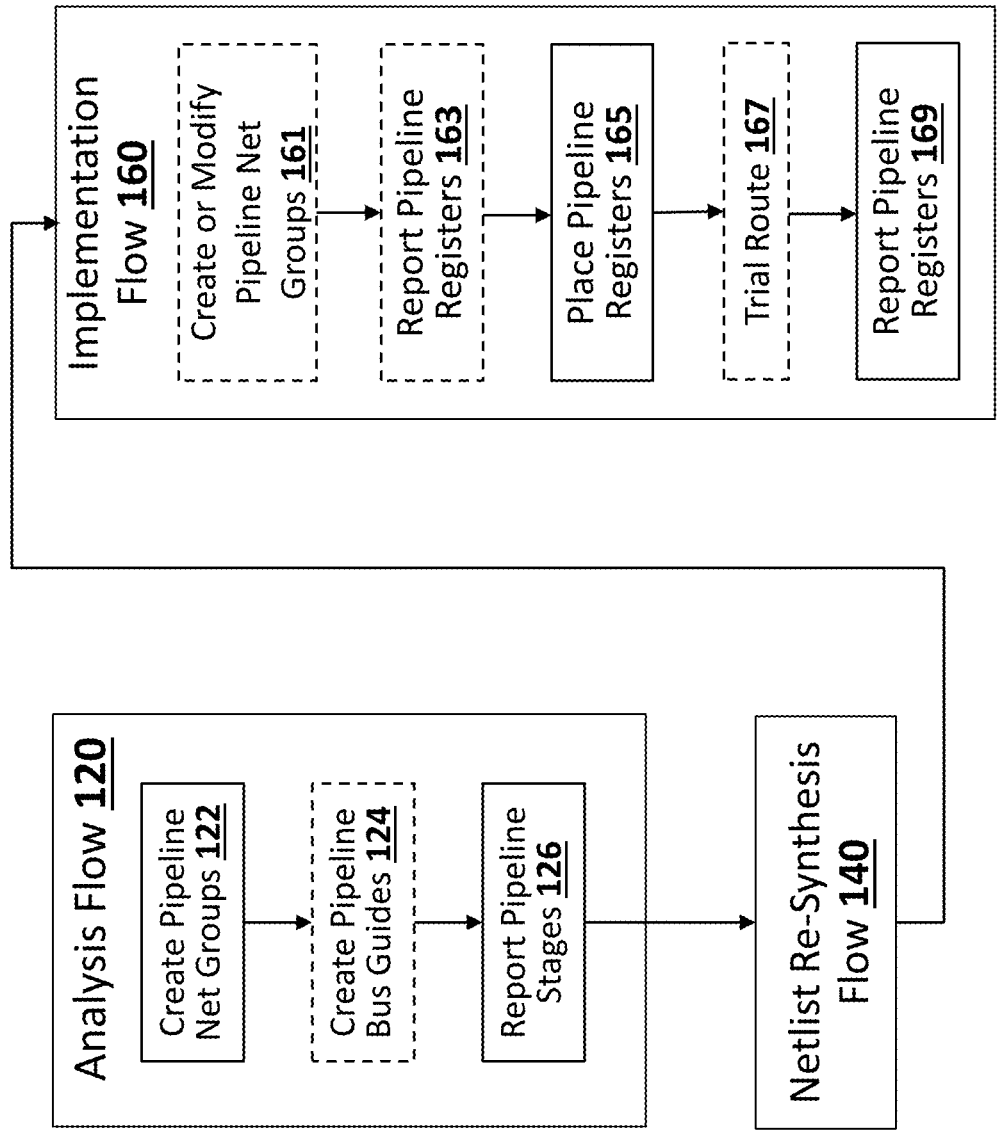
FIG. 1 is a block diagram depicting a conventional scan pipelining scheme.

For example, FIG. 1 is a block diagram depicting a conventional scan pipelining scheme. The conventional scheme performs an analysis flow 120, a netlist re-synthesis flow 140 which re-synthesizes a netlist (e.g., a hardware design netlist file which describes hardware in a VHSIC hardware description language), and an implementation flow 160 in this order. In the analysis flow 120, pipeline net groups are created (step 122); pipeline bus guides are created (optional, step 124); and pipeline stages are reported (step 126). In the implementation flow 160, the pipeline net groups are created or modified (optional, step 161); pipeline registers are reported (optional, step 163); pipeline registers are placed (step 165); trial route is performed (optional, step 167); and pipeline registers are finally reported (step 169). In the scheme shown in FIG. 1, a PnR tool is used to analyze the design to determine the required number of PFFs along a network. A synthesis tool is then leveraged to insert the PFFs into a netlist, and then the PnR tool places the PFFs optimally along the network. The flow shown in FIG. 1 lacks an approach to identify the correct clocking necessary for each PFF.

To solve these problems, according to certain aspects, embodiments in the present disclosure relate to techniques for a correct-by-construction method (e.g., algorithmically generating schemes, programs or strategies that make the system satisfy some specification or requirements) that can insert pipeline stages with correct clocking at an early synthesis stage thus avoiding the need for insertion of additional lockup elements before or after the pipeline stages, when placed in an existing scan-chain.

Another problem relates to optimizing the connections between higher-lever blocks and lower-level blocks in a hierarchical test design when applying a scan pipelining technique. For designs with DFT, a compression macro or a Logic Built In Self-Test (LBIST) macro in a higher-level hierarchical block may be physically distant from lower-level blocks, and placement locations of a compression/LBIST macro may result in long network connections between the LBIST/compression macro at a higher-level block and scan chain pins of lower-level blocks (e.g., scan enable pin). In some test designs, test time limitations may pose a requirement of high scan shift frequency, which may lead to timing problems when the LBIST/compression macro at the higher-level blocks interacts with the scan-chains of the lower-level blocks. To handle these timing problems, insertion of fixed number of scan pipelines stages (pipeline depth) and associated lockup elements may be performed, which would result in excessive DFT logic/area overhead.

Conventionally, a constant number of scan pipeline stages to all lower-level blocks from LBIST/compression macro at the higher-level block is maintained without minimizing the number of scan pipeline stages and associated lockup elements. For example, when a hierarchical test LBIST is applied to a target chip for use in the technical area of aerospace and defense, a high scan shift frequency of 200 MHz may be used to meet test time requirements. When an LBIST macro at the top level of the chip is physically distant from lower-level blocks' scan-chain pins, this may result in timing problems to meet a high scan-shift frequency for a large size design. To address the timing problems, a layout analysis can be performed which can suggest a different number of scan pipeline stages to meet the timing to each lower-level block. However, insertion of a fixed number of scan pipelines stages and associated lockup elements according to the suggested number scan pipeline stages may result in an excessive DFT logic/area overhead. Thus, there is a need for a mechanism to optimize the network connections between the LBIST/compression macro and the scan chain pins of lower-level blocks to maintain the required scan shift frequency and reduce the DFT overhead.

Figure 2:
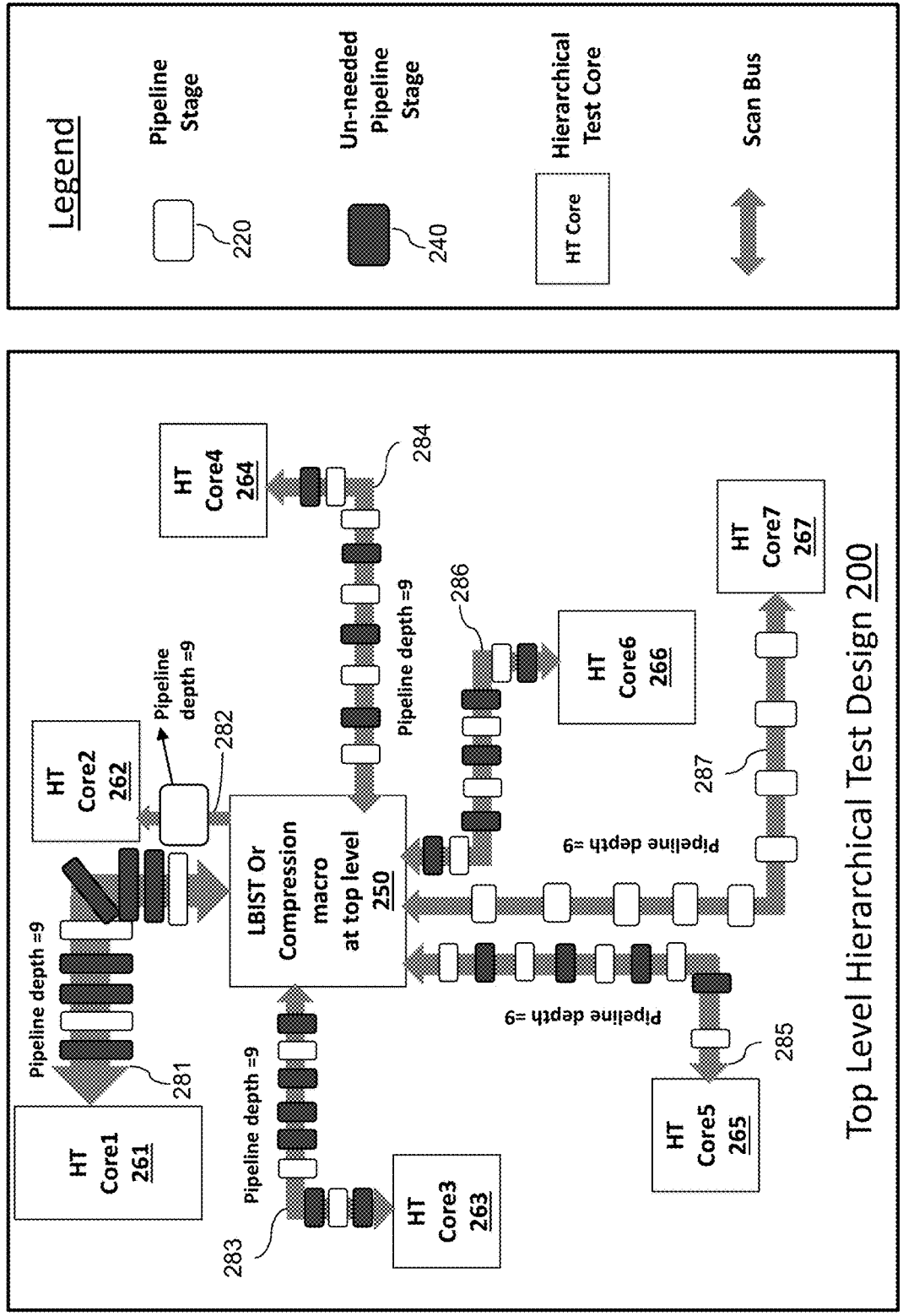
FIG. 2 is a schematic diagram showing an example top-level hierarchical test design using a conventional scan pipelining scheme.

FIG. 2 is a schematic diagram showing an example top-level hierarchical test design 200 using a conventional scan pipelining scheme. The top-level hierarchical test design 200 includes a LBIST/Compression macro (at top level) 250, hierarchical test (HT) Core1 to HT Core7 (denoted by 261-267), scan buses 281-287 connecting respective HT cores to the LBIST/Compression macro, and pipeline stages 220 and 240. Here, HT Core7 is the farthest core from the LBIST or Compression macro, and the pipeline stages 240 are not actually needed but are inserted according to the number of pipeline stages (=9) required to meet scan shift frequency/timing for the farthest block (HTCore7). The conventional scan pipelining scheme (e.g., the scheme shown in FIG. 1) will insert the same pipeline depth between each HT core and the LBIST/Compression Macro at the top level, as shown in FIG. 2. The insertion of unneeded pipeline stages 240 for nearer cores namely HT Core1, HT Core2, HT Core3, HT Core4, HT Core5, and HT Core6 will add an overhead (DFT overhead) to a DFT system.

Referring to FIGS. 1 and 2, in a conventional scan pipelining scheme, a PnR tool is used to perform automatic analysis of how many pipeline stages are needed, based on a given floorplan (analysis flow 120 in FIG. 1). A pipeline net group is defined for each bus (e.g., scan buses 281-287) that needs to be pipelined (e.g., step 122 in FIG. 1). Long net connections may exist between placed standard cells, blocks, IOs, or partitions (e.g., long connection between HT Core7 to LBIST/Compression macro 250). Pipeline spacing is calculated considering the frequency and technology node of the design, and pipeline spacing is then used to calculate an expected number of PFF stages for each net group. Two approaches that are used to insert PFF stages are (1) modifying RTL source and (2) defining a single, fixed pipeline length for all scan chains of lower-level blocks. A synthesis tool is then used to re-synthesize the block (e.g., netlist re-synthesis flow 140 in FIG. 1) to add a fixed number of pipeline stages where the fixed number is equal to the number of pipeline stages required to meet scan-shift timing of the farthest block (e.g., 9 pipeline stages for HT Core7 in FIG. 2). However, the conventional scan pipelining scheme does not insert an optimal number of pipeline stages for hierarchical test designs.

To solve this problem, according to certain aspects, embodiments in the present disclosure relate to techniques for inserting scan pipelines to meet a requirement of high scan shift frequency. Embodiments also relate to techniques for inserting an optimal number of pipeline stages depending on a physical distance of each of lower-level block instances from a Compression/LBIST macro at a higher-level block. Embodiments also relate to techniques for inserting an optimal number of pipeline stages for hierarchical test designs with pipeline stages customized for each net group and with guaranteed correct clocking. Here, the customized pipeline stages customized refers to variable pipeline depth depending on the distance of a lower-level block from the LBIST/compression macro at the higher-level block. Embodiments also relate to techniques for reducing a DFT overhead by ensuring that pipeline stage insertion does not result in addition of new scan-chain lockup elements. Embodiments also relate to techniques for performing a correct-by-construction method to ensure correct number of pipeline stages are inserted between the LBIST/compression macro of the higher-level block to the scan-chain pins of the lower-level blocks while keeping lockup element insertion optimal. Embodiments also relate to techniques for minimizing the number of scan pipeline stages and associated lockup elements.

A DFT system may implement or perform a scan pipeline insertion scheme. The scan pipeline insertion scheme may use a synthesis tool to insert a number of PFF stages based on analysis of an early physical layout, frequency, and technology node information. According to the scan pipeline insertion scheme, the number of pipeline stages can be customized for each instance of a sub-block based on an early physical layout analysis. The scan pipeline insertion scheme may analyze the clock to be used for inserting pipeline stages. For example, a head pipeline flip-flop stage may use the same clock as the first (head) flip-flop of a scan-chain (referred to as "capture flip-flop") and a tail pipeline flip-flop stage may use the same clock as the last (tail) flip-flop of the scan chain (referred to as "launch flip-flop"). The scan pipeline insertion scheme may use the same clock for the pipeline stage as the launch flip-flop or the capture flip-flop, thereby eliminating the requirement to add lockup elements for the pipeline stages.

The scan pipeline insertion scheme may include a step (1) of creating head and tail pipeline stages depending on a required optimal length derived from early layout guidelines, and a step (2) of defining scan chains with a head pipeline flip-flop stage or a tail pipeline flip-flop stage or both. Each of the head pipeline stage and the tail pipeline stage includes a number of pipeline flip-flops required in each stage. A scan chain may be defined as a connection of (i) a plurality of flip-flops (e.g., scannable D flip-flops) and optionally (ii) the head pipeline flip-flop stage or the tail pipeline flip-flop stage or both.

The scan pipeline insertion scheme may include a step (3) of using a unique, separate pipeline scan clock for the head and tail pipe stages and a step (4) of performing an initial scan chain connection to leverage clock connections of scan chain elements for pipeline stages. In performing the step (4), a first pipeline lockup element may be inserted between the head pipeline stage and the head flip-flop of the scan chain body (capture flip-flop), and a second pipeline lockup element may be inserted between the tail flip-flop of the scan chain body (launch flip-flop) and the tail pipeline stage. Based on rules of lockup element insertion (e.g., the table shown in FIG. 5), during the step (4) of initial scan chain connection, a separate pipeline scan clock may be used for the head and tail pipe stages and the first and second pipeline lockup elements. These pipeline lockup elements will then be used as a place holder for extracting correct clocks for pipeline elements from scan chain elements and will later be removed during the final scan chain-connection.

The scan pipeline insertion scheme may include a step (5) of extracting clock of the head flip-flop of the scan chain body (which is the second element of the final scan chain) for clock of the head pipeline stage and extracting clock of the tail flip-flop of the scan chain body (which is the second element from the last element of the final scan chain) for clock of the tail pipeline stage. The scan pipeline insertion scheme may include a step (6) of using these extracted clocks to adjust the clock pin connections of the head pipeline stage and the tail pipeline stage.

The scan pipeline insertion scheme may include a step (7) of deleting (i) initial scan chain connections performed in step (4) and (ii) initial, pipeline lockup elements associated with the chain, then performing or re-doing (final) scan chain connections. With correct clocks connected to the clock pins of the head pipeline stage and the tail pipeline stage, the step (7) of re-doing the scan-chain connections will eliminate the need for addition of new lockup elements.

A system for optimizing scan pipelining may include a memory containing instructions and a processor configured to execute those instructions. The processor may be configured to generate, based on a length of pipeline stages between a first block and a second block in a hardware test design, a first scan chain including at least one pipeline stage of a head pipeline stage or a tail pipeline stage. The processor may be configured to insert a plurality of flip-flops and at least one lockup element into the first scan chain. The processor may be configured to determine at least one clock (a first clock) to be used for at least one pipeline stage, using at least one lockup element and the plurality of flip-flops. The processor may be configured to generate, based on at least one clock, a second scan chain that connects at least one pipeline stage and the plurality of flip-flops.

The processor may be configured to obtain, based on analysis of a physical layout of the hardware test design, the length of pipeline stages between the first block and the second block. The hardware test design may be a hierarchical test design. The first block may be a block for compression or LBIST at a first level of the hierarchical test design. The second block may be a block at a second level of the hierarchical test design that is lower than the first level or at the same level of the hierarchical test design.

In determining at least one clock, the processor may be configured to determine a second clock to be used for at least one pipeline stage and at least one lockup element, and extract, from the plurality of flip-flops, at least one clock to be used for at least one pipeline stage, using the second clock for at least one lockup element as a placeholder.

In determining at least one clock, the processor may be configured to edit clock pin connections of at least one pipeline stage using the extracted clock. The extracted clock may include at least one clock for a head flip-flop of the plurality of flip-flops or a clock for a tail flip-flop of the plurality of flip-flops.

A plurality of these scan-chains constitutes a scan-bus. The processor may be configured to insert the same number of head and tail pipeline stages for all the scan-chains of the scan-bus between the first block (e.g., compression of LBIST macro) and the second block (e.g., a physically distant hierarchical test block) on the layout of the chip.

First, embodiments in the present disclosure can provide useful techniques that can extract clocking information for head and tail pipeline stages, thereby eliminating the need for additional lockup elements. A scan pipeline insertion scheme according to some embodiments may use the same clock for the pipeline stage as the launch flip-flop or the capture flip-flop, thereby eliminating the requirement to add lockup elements for the pipeline stages. The scan pipeline insertion scheme has been proven on Aerospace and Defense design targeting 200 MHz scan shift frequency.

Second, embodiments in the present disclosure can provide useful techniques for inserting, based on an early layout floorplan analysis, an optimal number of scan pipelines at lower-level blocks, higher-level blocks in a top-level hierarchical design, thereby reducing the DFT overhead in a DFT system. A scan pipeline insertion scheme according to some embodiments can insert an optimal number of pipeline stages with correct clocking in a hierarchical test design. The scan pipeline insertion scheme may be implemented in a DFT synthesis tool as a DFT feature.

Figure 3:
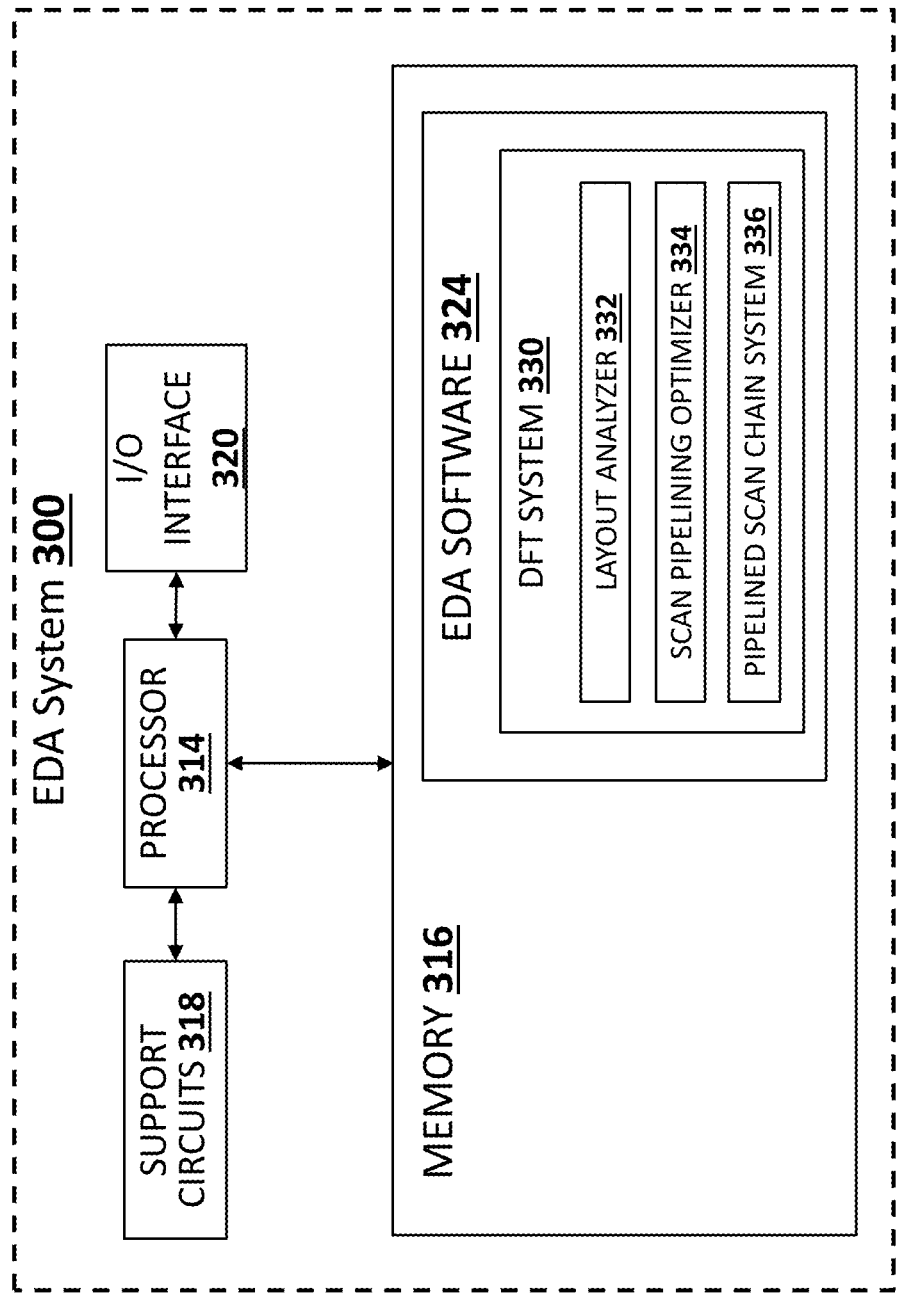
FIG. 3 is a block diagram depicting components of an EDA system, according to some embodiments.

FIG. 3 is a block diagram depicting components of an EDA system 300, according to some embodiments. The EDA system 300 may be any computing device that includes a processor 314, a memory 316, various support circuits 318, and one or more I/O interfaces 320. A processor 314 of the EDA system 300 may include circuitry configured to execute the various processes and tasks described herein. In some embodiments, the EDA system 300 may be implemented using a cloud computing system. Non-limiting examples of a processor 314 of the EDA system 300 may include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor.

Memory 316 of the EDA system 300 may store various forms of software and files, such as an operating system (OS) and EDA support software 324. Some of the commonly known memory 316 implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Support circuits 318 of the EDA system 300 may include conventional cache memory, power supply, clock circuits, data registers, I/O interfaces 320, and the like. An I/O interface 320 may be directly coupled to the memory 316 or coupled through the processor 314, and may be configured for communication with an external device via a communication link. An I/O interface 320 may also be configured to receive inputs from user interface devices (e.g., keyboard, mouse) and to generate an interactive graphical user interface (GUI) to output on a monitor an interactive display configured to receive user inputs form the various interface devices.

The EDA software 324 may be a software module, which may be executed by the EDA system 300. The EDA softer 324 may be configured to automate design and test processes of verifying the correctness of an electronic system (e.g., ICs or PCBs) against the specifications of the electronic system through various synthesis and verification steps. The EDA softer 324 may be configured to test a manufactured electronic system to ensure that it meets the specifications and/or quality requirements of the electronic system.

The EDA software 324 may include a DFT system 330 that can add testability features to hardware components so as to validate the hardware components' correct functioning, e.g., validating that the hardware components contain no manufacturing defects. The DFT system 330 may include a layout analyzer 332, a scan pipelining optimizer 334, and/or a pipelined scan chain system 336. The layout analyzer 332 can perform a layout analysis on a hardware design (e.g., a hierarchical test design) and suggest a number of scan pipeline stages for a block in the hardware design to meet a requirement for the block (e.g., timing requirements). The layout analyzer 332 can perform a layout analysis by analyzing a physical layout, frequency, and/or technology node information of a hardware design. The scan pipelining optimizer 334 can optimize scan pipelining by generating or creating an optimized scan chain. The scan pipelining optimizer 334 can generate an optimized scan chain by (1) selecting correct or optimal clocking necessary for each pipeline stage inserted along a network in a hardware design, thereby eliminating the need for insertion of additional lockup elements thereby reducing the DFT area overhead while also satisfying timing requirements for a high scan shift frequency and (2) insert an optimal number of pipeline stages in a hierarchical test design, thereby reducing the DFT overhead in a DFT system. The pipelined scan chain system 336 can perform or execute scan chain operations based on a scan chain generated by the scan pipelining optimizer 334.

In some cases, various software modules (e.g., EDA software 324) may be executed in whole or in part on an EDA system 300, such as an administrator or user computer, configured to communicate data associated with the respective software module to and from an external device (not shown).

Figure 4:
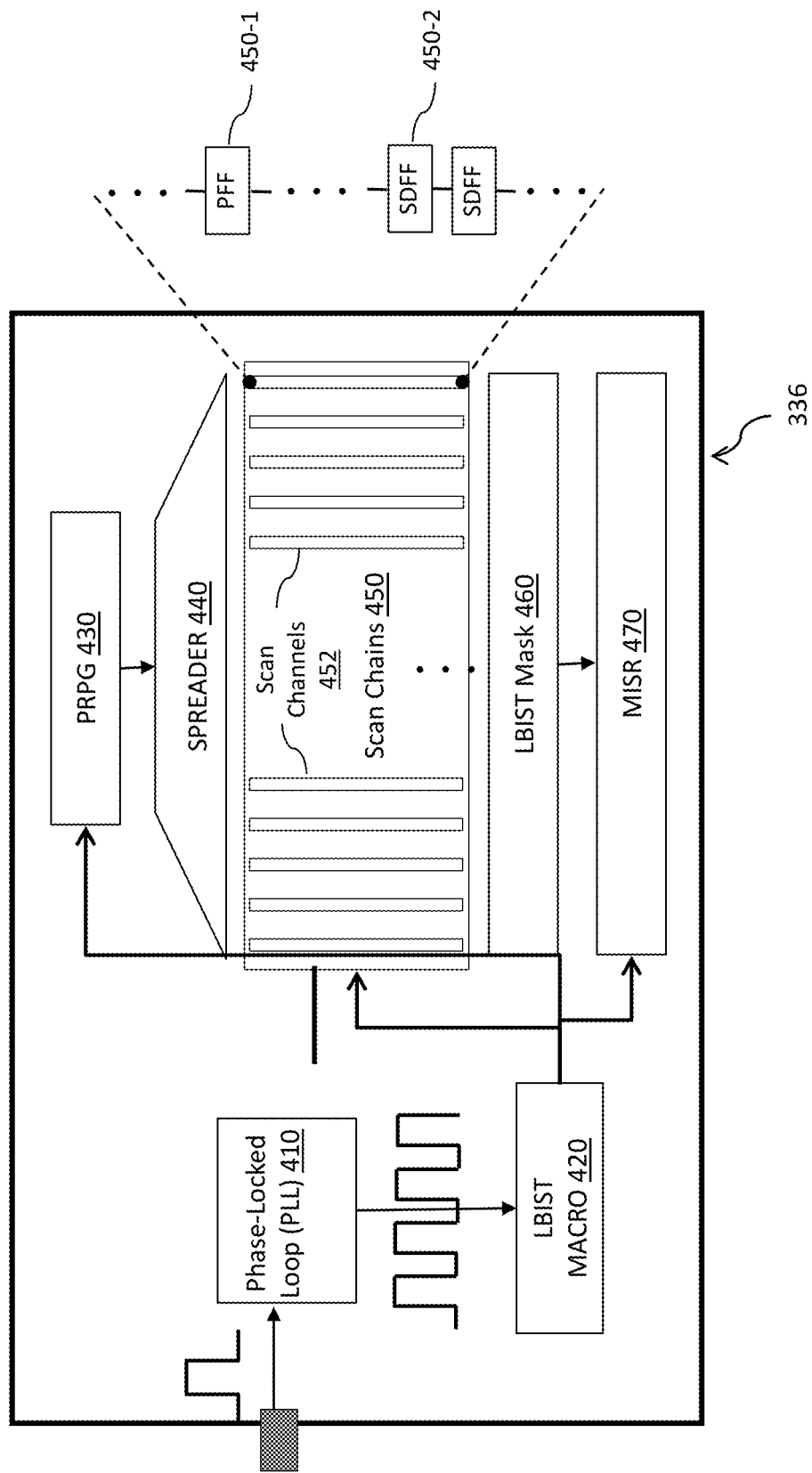
FIG. 4 is a schematic diagram showing an example pipelined scan chain system, according to some embodiments.

FIG. 4 is a schematic diagram showing an example pipelined scan chain system, according to some embodiments. The pipelined scan chain system shown in FIG. 4 may be an example of the pipelined scan chain system 336 in FIG. 3. Referring to FIGS. 3 and 4, a DFT system (e.g., DFT system 330) may implement or generate an LBIST (e.g., LBIST macro 420) such that the LBIST sits on top of scan channels (e.g., scan channels 452) in compression mode. The LBIST may add logic to control channel inputs (e.g., scan chains 450 in respective scan channels 452) and observe channel outputs. The DFT system may implement or generate a pseudo random pattern generator (PRPG) (e.g., PRPG 430) such that the PRPG is used to control the channel inputs by feeding random values into a scan chain (e.g., scan chain 450). The DFT system may implement or generate an LBIST mask 460 that can selectively mask certain outputs from scan chains on multiple scan channels based on LBIST logic, or fix scan chain outputs to be properly input to a register (e.g., MISR 470). The DFT system may implement or generate a multiple input shift register (MISR) (e.g., MISR 470) such that the MISR is used to observe the channel outputs by observing values from the channels and combines the values with existing data.

Referring to FIG. 4, the pipelined scan chain system 336 may use a phase-locked loop (PLL) 410 to generate clock signals to be input to the LBIST macro 420. Thus, the LBIST macro 420 can control PRPG 430, scan chains 450, LBIST mask 460 and MISR 470 such that the channel inputs can be clocked into the multiple scan chains 450 and the output of the LBIST mask 460 may be synchronized with the clock signals. In each of the scan chains 450, one or more PFFs 450-1 as pipelining stages may be inserted along a network of flip flops (e.g., scannable D flip-flops (SDFF) 450-2) to achieve timing requirements. In some embodiments, the pipelining stages may be inserted at the head and the tail of the scan chains 450 (see FIG. 12). The pipelined scan chain system 336 may cause the PRPG 430 to feed random values into a spreader 440. The spreader 440 may be a decompressor that receives a compressed scan pattern and generates decompressed scan patterns on the scan chains 450. The pipelined scan chain system 336 may cause the LBIST mask 460 to selectively mask certain outputs from the scan chains 450. The pipelined scan chain system 336 may cause the MISR 470 to observe the channel outputs from the LBIST mask 460 and to combine values of the channel outputs with existing data. Embodiments of the present disclosure are not limited to a design using LBIST and can apply to any scan-chain based (LBIST/Compression) system, as mentioned herein.

FIG. 5 is a table showing cases which require lockup elements along with type of the required lockup element.

When different test clocks and mixing of edges are allowed in the same scan chain, a DFT system (e.g., DFT system 330 or scan pipelining optimizer 334 in FIG. 3) may insert data lockup elements into a scan path to ensure race free scan shifting and independent controllability and observability of all scan bits or to get rid of timing problems arising due to either of uncontrolled clock skew or uncommon clock path. In some cases, a latch lockup element (e.g., a level sensitive latch) may be used and in other cases, a flop element (e.g., an edge sensitive flop) can be used.

FIG. 5 shows four different cases based on which a DFT system can determine whether to insert lockup elements in a scan path or not. For example, in the case in the first row, lockup elements are not needed when a launching scan bit (e.g., a scan bit of the last flip-flop in a scan chain) is sampled at a falling edge of a first clock pulse and a capturing scan bit (e.g., a scan bit of the first flip-flop in a scan chain) is sampled at a rising edge of a second clock pulse. In the case in the second row, lockup elements are needed when (1) a launching scan bit is sampled at a falling edge of a first clock pulse, (2) a capturing scan bit is sampled at a falling edge of a second clock pulse, and (3) the launch flop and the capture flop have different clocks. The case in the second row also shows that if lockup elements are needed, lockup elements such as a high level latch (which is active when a clock pulse is high) or a positive edge triggered flip-flop (in which data is sampled at a positive or rising edge of a clock pulse) are allowed. In the case in the third row, lockup elements are needed when (1) a launching scan bit is sampled at a rising edge of a first clock pulse, (2) a capturing scan bit is sampled at a rising edge of a second clock pulse, and (3) the launch flop and the capture flop have different clocks. The case in the third row also shows that if lockup elements are needed, lockup elements such as a low level latch (which is active when a clock pulse is low) or a positive edge triggered flip-flop are allowed. In the case in the fourth row, lockup elements are needed when (1) a launching scan bit is sampled at a rising edge of a first clock pulse, and (2) a capturing scan bit is sampled at a falling edge of a second clock pulse. The case in the fourth row also shows that if lockup elements are needed, as lockup elements, positive edge triggered flip-flops are allowed while latches are not allowed.

Figure 6:
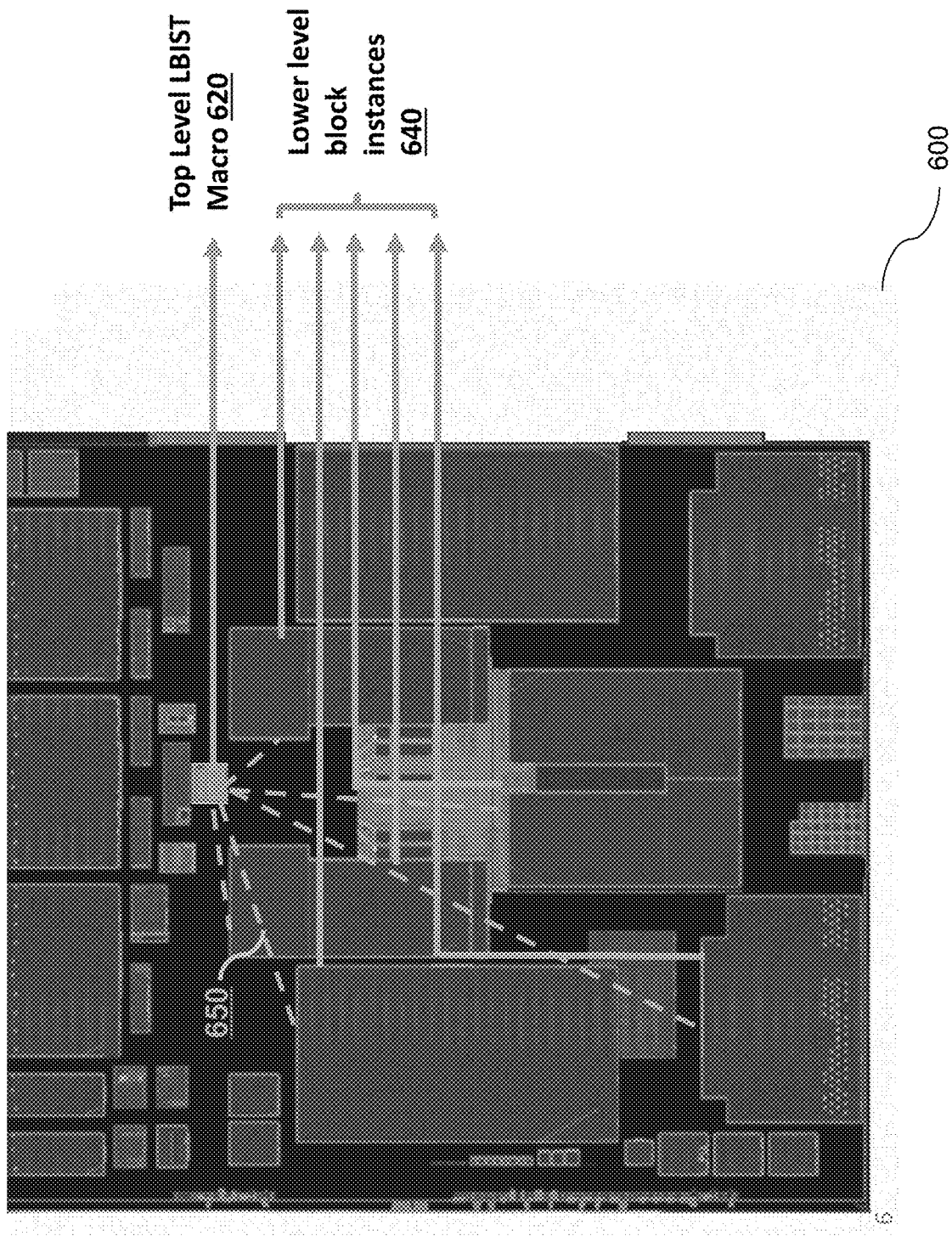
FIG. 6 is a schematic diagram showing an example hierarchical Logic Built In Self Test design layout depicting the physical distance of each of the design blocks from other blocks, according to some embodiments.

FIG. 6 is a schematic diagram showing an example hierarchical LBIST test design layout 600 depicting the physical distance of each of the design blocks from other blocks according to some embodiments. The hierarchical LBIST test design layout 600 may be a physical layout obtained based on an early layout analysis. The layout 600 may include a top level LBIST macro 620 and lower level block instances 640 which are physically distant from the LBIST macro 620. Dashed lines 650 indicate a respective physical distance of each lower-level block instance from the top level LBIST macro 620. A DFT system (DFT system 330 or layout analyzer 332 in FIG. 3) may perform analysis on a physical layout such as the design layout 600 and determine an optimal number of pipeline stages based on results of the analysis, for example, a physical distance of each lower-level block instance from a top level LBIST macro.

Figure 7:
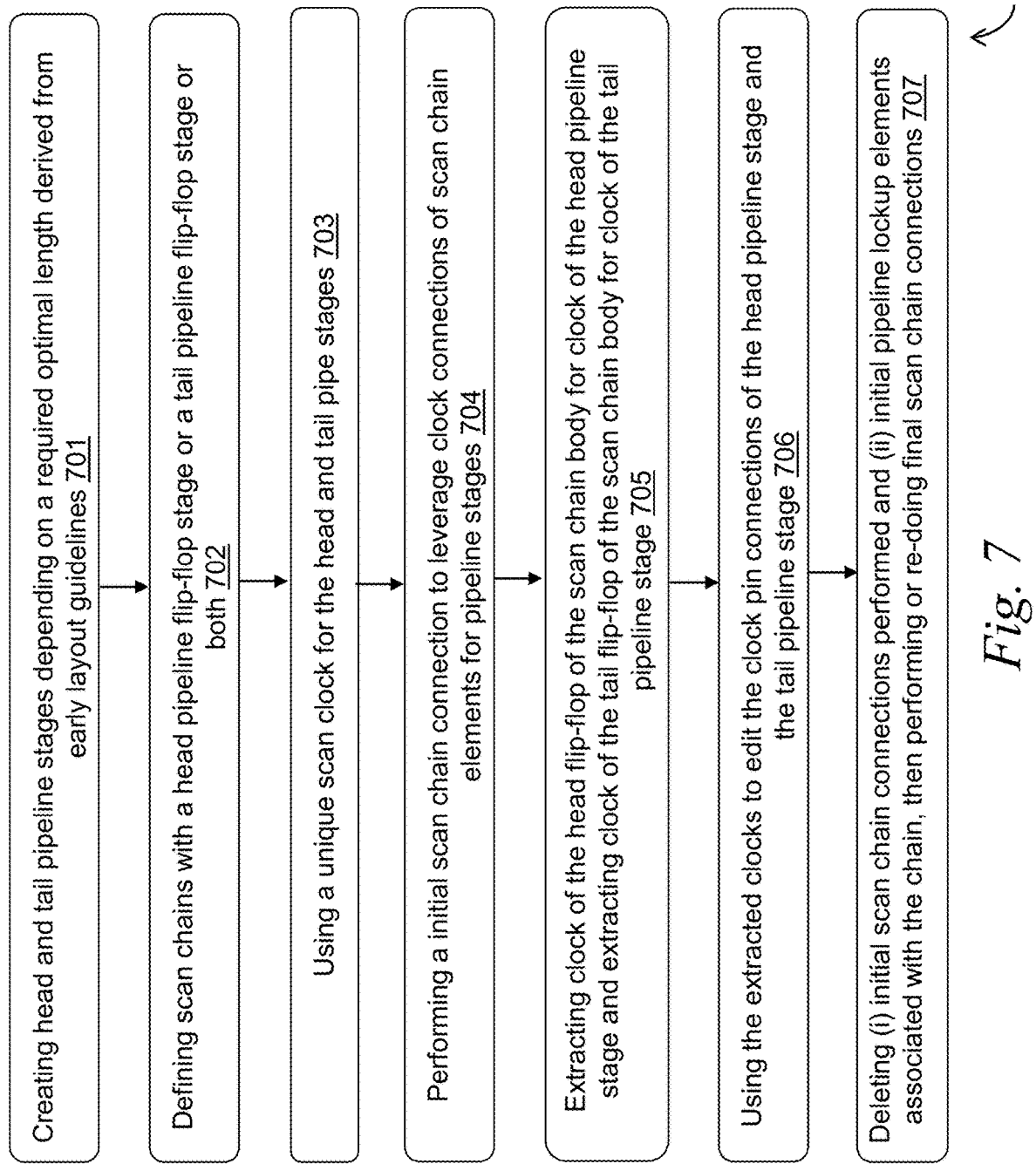
FIG. 7 is a flowchart illustrating an example methodology for performing a scan pipeline insertion scheme, according to some embodiments.
Figure 8:
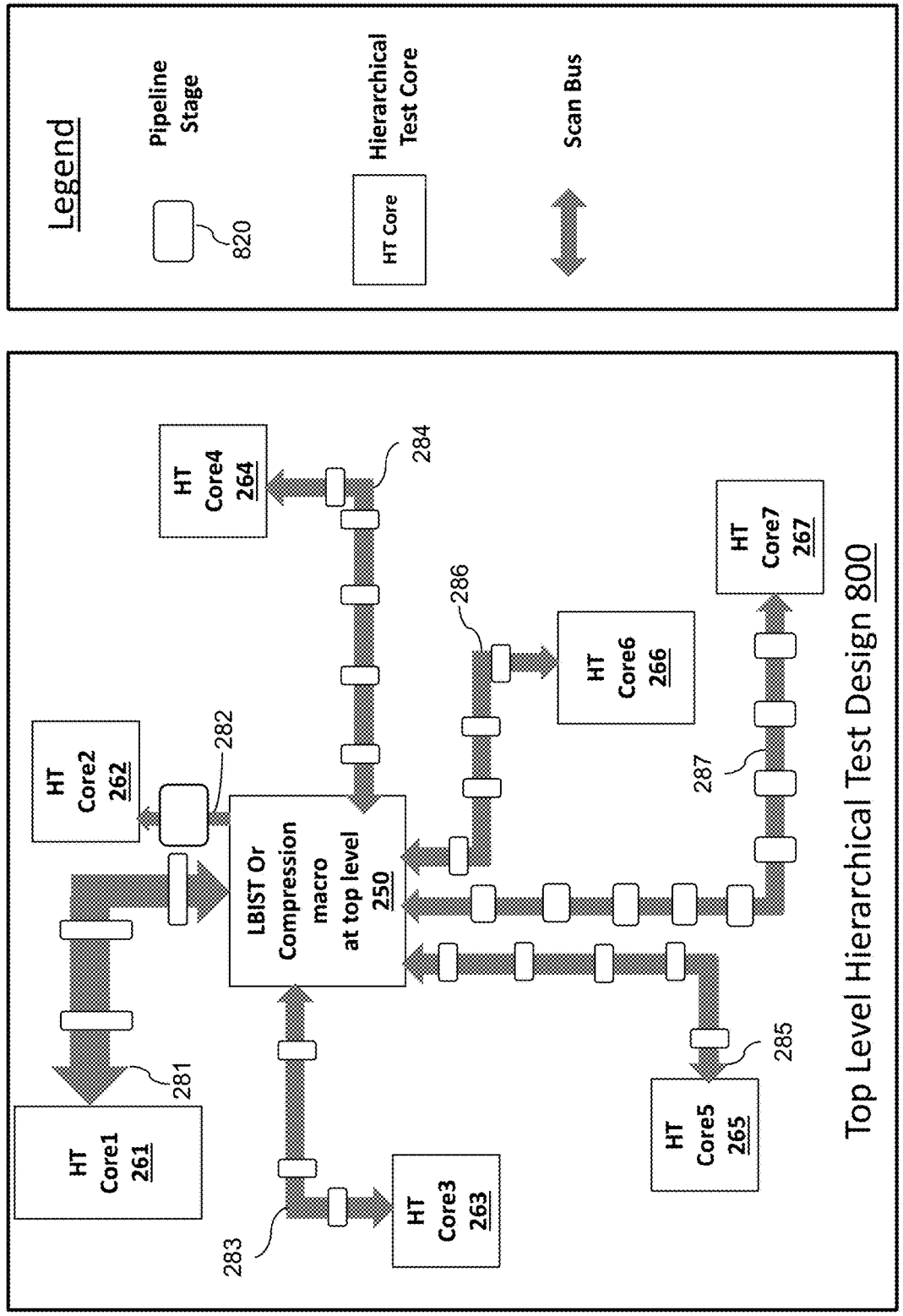
FIG. 8 is a schematic diagram showing an example top-level hierarchical test design using a scan pipeline insertion scheme, according to some embodiments.

FIG. 7 shows execution steps for performing a scan pipeline insertion scheme, according to a method 700. FIG. 8 is a schematic diagram showing an example top-level hierarchical test design 800 using a scan pipeline insertion scheme, according to some embodiments. FIG. 9 to FIG. 12 are block diagrams depicting steps of a scan pipeline insertion scheme according to some embodiments. Now, the method 700 will be described with reference to FIG. 8 to FIG. 12. The method 700 may include execution steps 701, 702, 703, 704, 705, 706 and 707 performed in an EDA system (e.g., EDA system 300) including a DFT system (e.g., DFT system 330 in FIG. 3). The DFT system may include a layout analyzer (e.g., layout analyzer 332 in FIG. 3), a scan pipelining optimizer (e.g., scan pipelining optimizer 334 in FIG. 3), and/or a pipelined scan chain system (e.g., pipelined scan chain system 336 in FIG. 3). It should be understood that the steps described herein are merely illustrative and additional or substitute steps should also be considered to be within the scope of this disclosure. Furthermore, methods with a fewer numbers of steps should also be considered to be within the scope of this disclosure.

Figure 9:
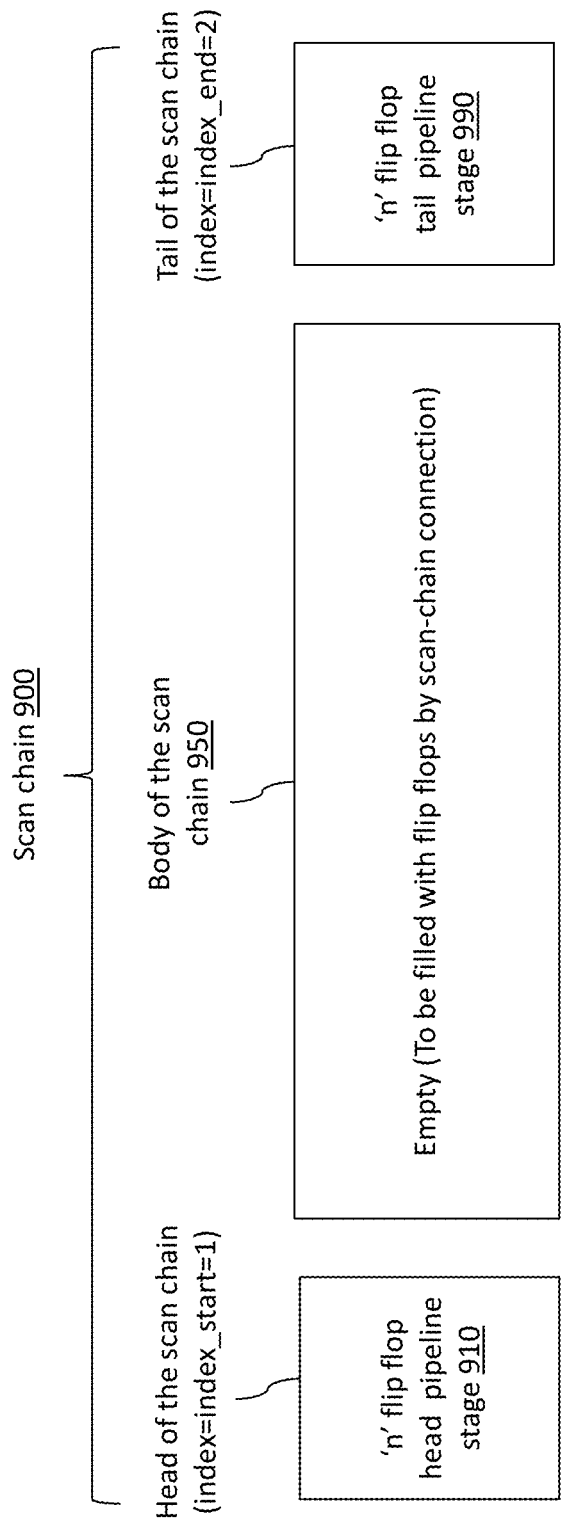
FIGS. 9 to 12 are block diagrams depicting steps of a scan pipeline insertion scheme, according to some embodiments.

At step 701, a processor of the EDA system (e.g., processor 314 in FIG. 3) may create head and tail pipeline stages (e.g., head pipeline stage 910 and tail pipeline stage 990 in FIG. 9) depending on a required optimal length derived from early layout guidelines (e.g., layout 600 in FIG. 6). FIG. 8 shows example optimal lengths derived from early layout guidelines. Referring to FIG. 8, the top-level hierarchical test design 800 includes the same blocks and scan buses as shown in FIG. 2, for example, the LBIST/Compression macro (at top level) 250, hierarchical test (HT) Core1 to HT Core7 (denoted by 261-267), and scan buses 281-287 connecting respective HT cores to the LBIST/Compression macro 250, and pipeline stages 220, except for there is no unneeded pipeline stages (such as pipeline stages 240 in FIG. 2). Instead, an optimal number of pipeline stages 820 are inserted depending on a physical distance of each of lower-level block instances (e.g., HT Core1 to HT Core7) from a Compression/LBIST macro at a higher-level block. For example, as shown in FIG. 8, the number of pipeline stages N (lower-level block instance) required to meet scan shift frequency/timing between each lower-level block instance from the Compression/LBIST macro at a higher-level block is as follows: N (HT Core1)=3; N (HT Core2)=1; N (HT Core3)=3; N (HT Core4)=5; N (HT Core5)=5; N (HT Core6)=4; N (HT Core7)=9.

Figure 10:
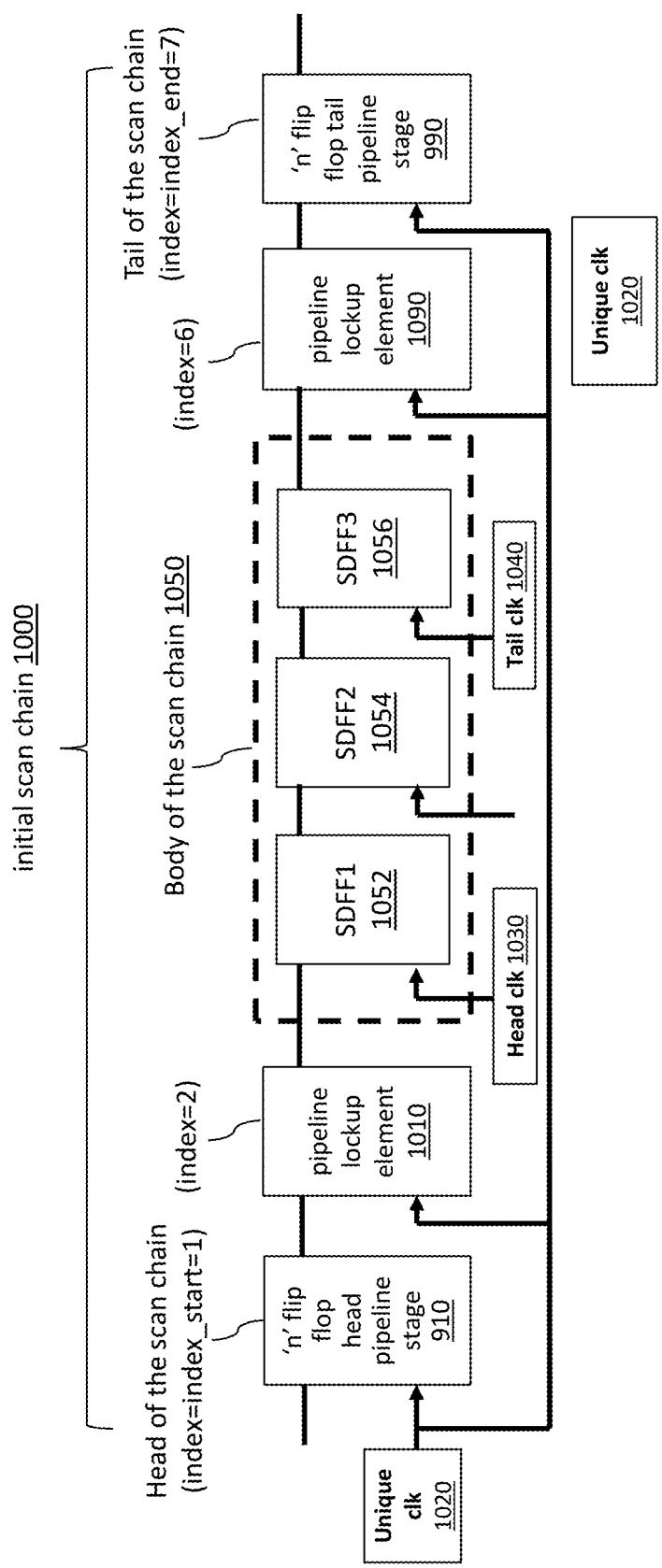

At step 702, the processor of the EDA system may define scan chains with a head pipeline flip-flop stage or a tail pipeline flip-flop stage or both. A scan chain (a final scan chain) may be defined as a connection of (i) a plurality of flip-flops (e.g., scannable D flip-flops (SDFF) 1052, 1054, 1056 in FIG. 10) and optionally (ii) the head pipeline flip-flop stage (e.g., head pipeline stage 910 in FIG. 9) or the tail pipeline flip-flop stage (e.g., tail pipeline stage 990 in FIG. 9) or both. For example, referring to FIG. 9, a scan chain 900 may be initially defined with (i) a scan body 950 which is to be filled with flip flops as shown in FIG. 10; and (ii) both the head pipeline stage 910 and the tail pipeline stage 990. Each of the head pipeline stage and the tail pipeline stage may include a number of pipeline flip-flops required in the respective stage. It is noted that there is no scan chain where the body stays empty, the scan body depicted in FIG. 9 will be filled by scannable flip-flops as shown in FIG. 10. Referring to FIG. 9, where the head pipeline stage 910 includes 'n' flip-flops where n equals the number of pipeline flip-flops required in the head pipeline stage 910. Similarly, the tail pipeline stage 990 includes 'n' flip-flops where n equals the number of pipeline flip-flops required in the tail pipeline stage 990. As shown in FIG. 9, because the scan body 950 is empty, the head pipeline stage 910 is at a position index index=1=index_start (the start of the scan chain), and the tail pipeline stage 990 is at a position index index_end (the end of the scan chain).

A scan chain may be defined using a scan definition command. For example, a scan definition command may take parameters including (1) scan chain name, (2) head segment, (3) tail segment, (4) body segment, (5) serial data input (SDI), (6) serial data output (SDO), and/or (7) shift-enable test signal. The output of scan-chain definition command may be a standard 'scandef' file that can be used by design tools and automatic test pattern generation (ATPG) tools. The 'scandef' file may include references to the head and tail pipeline stages inserted by the scan pipeline insertion scheme.

At step 703, the processor of the EDA system may use a separate pipeline scan clock for the head and tail pipe stages. For example, referring to FIG. 10, a separate pipeline clock 1020 may be used for the head pipe stage 910 and tail pipe stage 990.

At step 704, the processor of the EDA system may perform a initial scan chain connection to leverage clock connections of scan chain elements for pipeline stages. For example, referring to FIG. 10, the processor may add scannable D flip-flops 1052, 1054, 1056 into a scan chain body 1050, and then perform a initial scan chain connection by inserting a first pipeline lockup element 1010 between the head pipeline stage 910 and a head flip-flop 1052 of the scan chain body 1050 (capture flip-flop) and inserting a second pipeline lockup element 1090 between a tail flip-flop 1056 of the scan chain body 1050 (launch flip-flop) and the tail pipeline stage 990, thus defining the initial scan chain 1000. During the initial scan chain connection, the processor may determine whether to insert a pipeline lock element or not, based on rules of lockup element insertion (e.g., the table shown in FIG. 5) and insert pipeline lockup elements based on a result of the determination. This stems from the fact that the pipeline insertion scheme creates the pipeline stages with a separate pipeline clock 1020 which does not match the clocking for any of the scan-chain flip flops thereby resulting in initial pipeline lockup latch insertion based on rules of lockup element insertion (e.g., the table shown in FIG. 5) The inserted pipeline lockup elements will then be used as a place holder for extracting correct clocks for lockup elements from scan-chain elements (see step 705 in FIG. 7), and will later be removed during final scan chain-connection (see step 707 in FIG. 7).

At step 705, using pipeline lockup elements (e.g., the first and second pipeline lockup elements 1010, 1090 in FIG. 10) as a reference position in the scan-chain, the processor of the EDA system may extract a clock of the head flip-flop of the scan chain body (e.g., flip-flop 1052 in FIG. 10) for clock of the head pipeline stage (e.g., head pipeline stage 910) and extract a clock of the tail flip-flop of the scan chain body (e.g., flip-flop 1056 in FIG. 10) for clock of the tail pipeline stage (e.g., tail pipeline stage 990). For example, referring to FIG. 10, for the clock of the head pipeline stage 910, the processor may extract a clock 1030 of the element at a position index index=(index_start+2)=3, which is the flip flop 1052, from the element list of the initial scan chain 1000. For the clock of the tail pipeline stage 990, the processor may extract a clock 1040 of the element at a position index index=(index_end-2)=5, which is the flip flop 1056, from the element list of the initial scan chain 1000. It should be understood that the steps described herein are merely illustrative and alternative steps such as directly extracting the clock of the first flip-flop of the scan-chain 1052 and the last flip-flop of the scan-chain 1056 and creating pipeline stages accordingly using such clocks, should also be considered to be within the scope of this disclosure. There can be multiple optimal methods used to extract the clock for the pipeline stages and should also be considered to be within the scope of this disclosure.

At step 706, the processor of the EDA system may use the extracted clocks to edit the clock pin connections of the head pipeline stage and the tail pipeline stage. For example, referring to FIG. 11, after using pipeline lockup element as a placeholder to extract clocks, the processor may re-do clock pin connection for pipeline stages such that the head clock 1030 is used for both the head pipeline stage 910 and the flip-flop 1052, and the tail clock 1040 is used for both the tail pipeline stage 990 and the flip-flop 1056, thereby defining a initial scan chain 1100 including a scan chain body 1150.

At step 707, the processor of the EDA system may delete (i) initial scan chain connections performed in step 704 and (ii) pipeline lockup elements associated with the chain, then performing or re-doing (final) scan chain connections. For example, the processor may delete (i) initial scan chain connections performed in step 704 and (ii) the pipeline lockup elements (e.g., pipeline lockup elements 1010 and 1090 in FIG. 11) associated with the initial scan chain (e.g., initial scan chain 1100 in FIG. 11), then performing or re-doing (final) scan chain connections to define a scan chain 1200 including a scan chain body 1250 (see FIG. 12). Referring to FIG. 12, with correct clocks (e.g., head clock 1030 and tail 1040) connected to the clock pins of the head pipeline stage 910 and the tail pipeline stage 990, the step 707 of re-doing the scan-chain connections will not require addition of new lockup elements. That is, the resultant scan chain 1200 is free of any additional lockup elements required because of insertion of pipeline stages.

In some embodiments, a DFT system (e.g., DFT system 330 or scan pipelining optimizer 334 in FIG. 3) may implement or perform a scan pipeline insertion scheme (e.g., method 700 of scan pipeline insertion scheme in FIG. 7). The scan pipeline insertion scheme may use a synthesis tool (e.g., scan pipelining optimizer 334 in FIG. 3 or any separate synthesis tool) to insert a number of PFF stages based on (1) analysis of an early physical layout (e.g., physical layout 600 in FIG. 6), frequency (e.g., scan shift frequency), and/or (2) technology node information that is used to determine a maximum achievable circuit speed or how many pipeline stages will be required for a certain distance. For example, technology node information includes information on the manufacturing process (e.g., 28 nm, 14 nm, 10 nm, etc.) and often the specific fabrication facility (e.g., TSMC®, GlobalFoundries®, etc.) that determines the properties of the circuits in an integrated circuit design like gate delay, propagation delay(s), wire resistance and capacitance, and includes other parameters that determine the maximum speed a circuit is able to achieve.

According to the scan pipeline insertion scheme, the number of pipeline stages can be customized for each instance of a sub-block based on an early physical layout analysis. For example, referring to FIG. 8, the number of pipeline stages N (lower-level block instance) for each lower-level block instance is: N (HT Core1)=3; N (HT Core2)=1; N (HT Core3)=3; N (HT Core4)=5; N (HT Core5)=5; N (HT Core6)=4; N (HT Core1)=9. The scan pipeline insertion scheme may analyze or determine a clock to be used for inserting pipeline stages. For example, referring to FIG. 12, a head pipeline flip-flop stage 910 may use the same clock as the first (head) flip-flop 1052 of a scan-chain body 1250 ("launch flip-flop"), and a tail pipeline flip-flop stage 990 may use the same clock as the last (tail) flip-flop of the scan chain body 1250 ("capture flip-flop"). In other words, the scan pipeline insertion scheme may use the same clock for the pipeline stage as the launch flip-flop or the capture flip-flop, thereby eliminating the requirement to add lockup elements for the pipeline stages.

An estimated DFT area overhead when using a conventional scan pipelining scheme is presented below. This estimated DFT area overhead will be compared with an estimated DFT area overhead when using a scan pipelining scheme according to some embodiments of the present disclosure (e.g., the scheme illustrated in FIG. 7) in the next section.

It is assumed that (1) y denotes an area of a single pipeline element; (2) W(a) and W(b) denote scan bus width (number of scan-in and scan-out pins) of core A and core B, respectively; (3) P(a) and P(b) denote scan-pipeline depth required for core A and core B, respectively; and (4) P(max) denotes scan pipeline depth of the farthest core where P(max)>P(a) and P(max)>P(b).

Number of scan-pipeline flip-flops for each core denoted by $N_{f\_old}$ (core) is given as follows:

For core A, $N_{f\_old}(a)=P(\max)*W(a)$; for core B, $N_{f\_old}(b)=P(\max)*W(b)$ (Equation 1)

Cost of lockup element insertion per core denoted by $C_{lu\_old}$ (core) is given as follows:

For core A, $C_{lu\_old}(a)=2*W(a)$ (1 at tail and 1 at head of each scan chain) (Equation 2)

For 'n' number of hierarchical test (HT) cores, total number of instances (pipeline stages+lockup elements) inserted, denoted by $N_{total\_insertions\_old}$ is given as follows:

$N_{total\_insertions\_old}=(P(\max)*W(a)+P(\max)*W(b)+\ldots P(\max)*W(n))+2(W(a)+W(b)+\ldots+W(n))=P(\max)(W(a)+W(b)+\ldots W(n))+2(W(a)+W(b)+\ldots W(n))=(P(\max)+2)*(W(a)+W(b)+\ldots W(n))$ (Equation 3)

For 'n' number of hierarchical test (HT) cores, total area overhead due to scan pipeline insertion denoted by $O_{area\_Insertions\_old}$ is given as follows:

$O_{area\_insertions\_old}$=Area of one pipeline element*Total number of inserted instances=$y*(P(\max)+2)*(W(a)+W(b)+\ldots W(n))$ (Equation 4)

It is noted that an impact of clock tree insertion on these elements is not included in the calculation above.

An estimated DFT area overhead when using the scheme illustrated in FIG. 7 is presented below.

Number of scan-pipeline flip-flops for each core denoted by $N_{f\_new}$(core) is given as follows:

For core A, $N_{f\_new}(a)=P(a)*W(a)$; for core B, $N_{f\_new}(b)=P(b)*W(b)$ (Equation 5)

Cost of lockup element insertion per core denoted by $C_{lu\_new}$ (core) is given as follows:

$C_{lu\_new}(a)=C_{lu\_new}(b)=\ldots$=Null (because of separate pipeline clocking scheme used to insert pipeline stages) (Equation 6)

For 'n' number of hierarchical test (HT) cores, total number of instances (pipeline stages) inserted (no lockup element being inserted), denoted by $N_{total\_insertions\_new}$ is given as follows:

$N_{total\_insertions\_new}=P(a)*W(a)+P(b)*W(b)+\ldots P(n)*W(n)$ (Equation 7)

For 'n' number of hierarchical test (HT) cores, total area overhead due to scan pipeline insertion denoted by $O_{area\_insertions\_new}$ is given as follows:

$O_{area\_insertions\_new}$=Area of one pipeline element*Total number of inserted instances=$y*(P\ P(a)*W(a)+P(b)*W(b)+\ldots P(n)*W(n))$ (Equation 8)

For 'n' number of hierarchical test (HT) cores, total area saving due to scan pipeline insertion denoted by $S_{area\_new}$ is given as follows:

$S_{area\_new}=O_{area\_insertions\_old}-O_{area\_insertions\_new}=(y*(P(\max)+2)*(W(a)+W(b)+\ldots W(n)))-(y*(P(a)*W(a)+P(b)*W(b)+\ldots P(n)*W(n)))$ (Equation 9)

Equation 9 shows that the scheme illustrated in FIG. 7 can save a lot of pipeline elements area compared with the conventional scan pipelining scheme.

FIG. 13 shows execution steps for optimizing scan pipelining, according to a method 1300. The method 1300 may include execution steps 1302, 1304, 1306, and 1308 performed in an EDA system including a processor (e.g., EDA system 300 including processor 314 in FIG. 3). It should be understood that the steps described herein are merely illustrative and additional or substitute steps should also be considered to be within the scope of this disclosure. Furthermore, methods with a fewer numbers of steps should also be considered to be within the scope of this disclosure.

Figure 11:
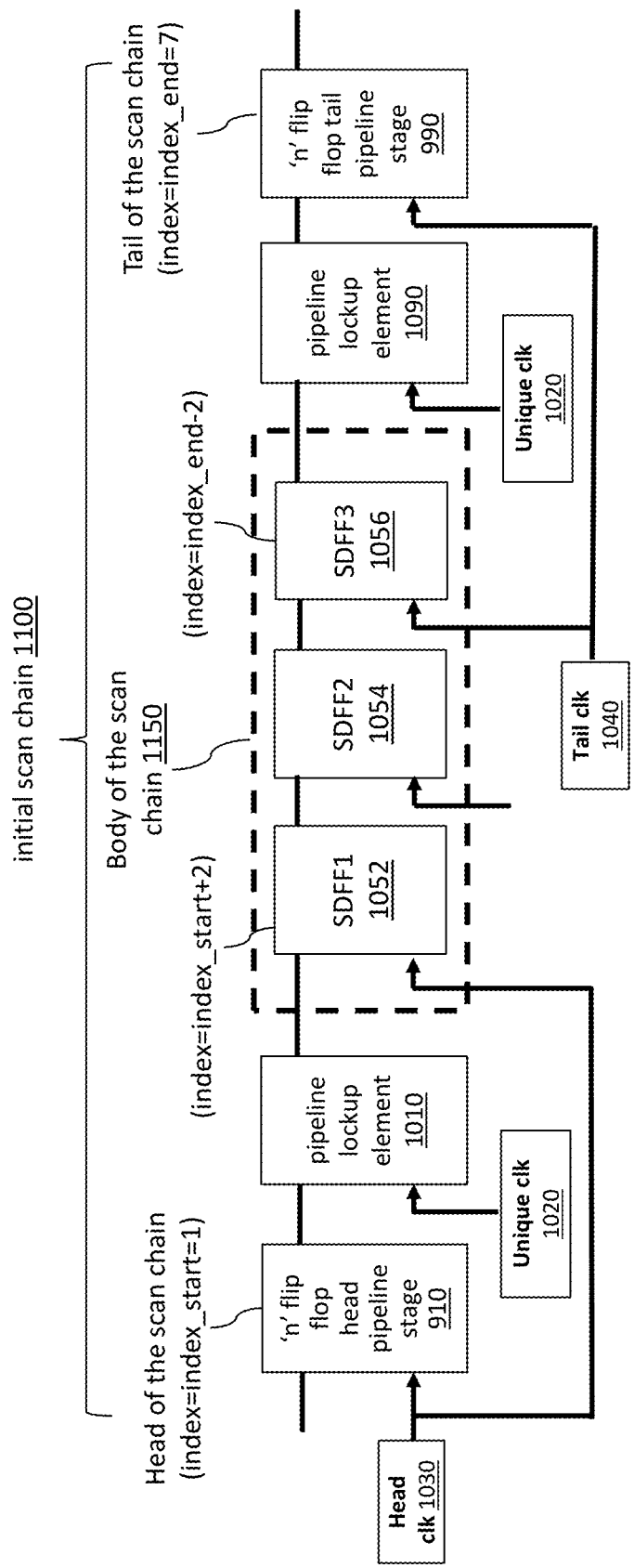
Figure 12:
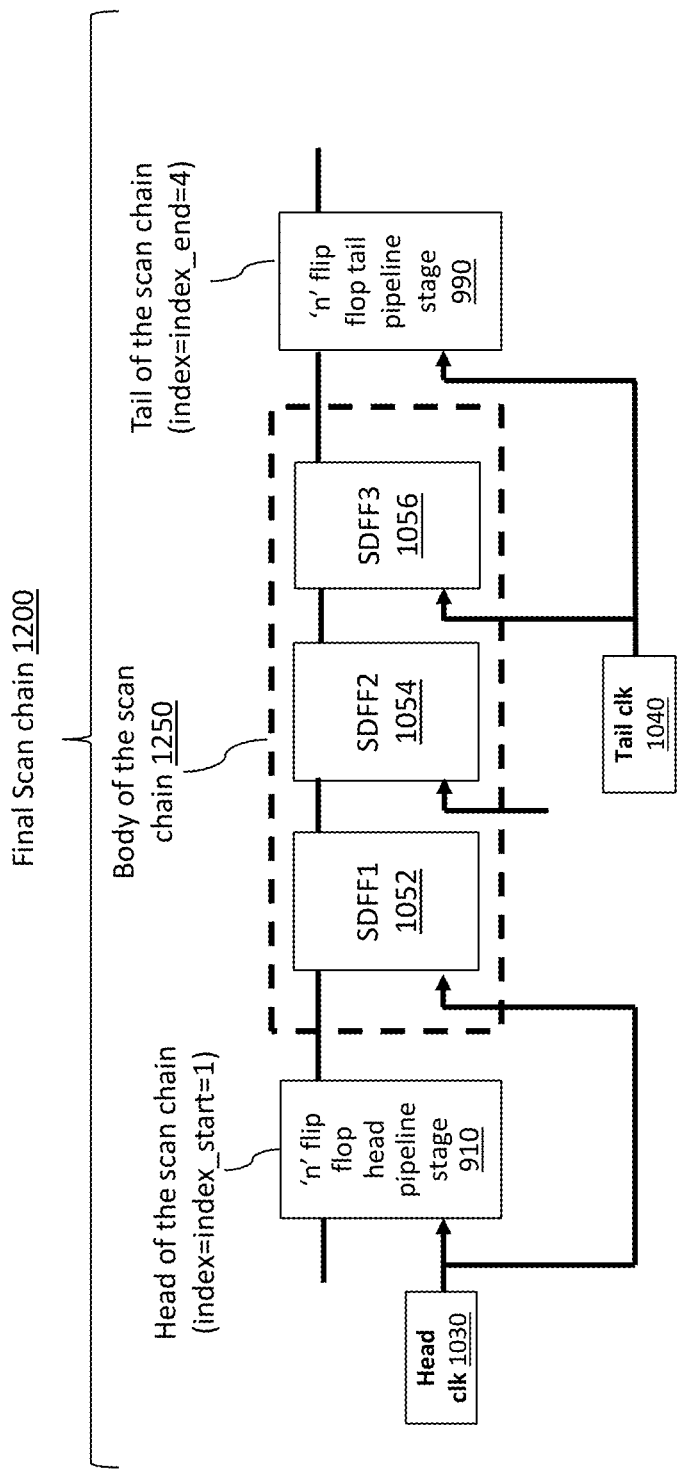

At step 1302, the processor of the EDA system may generate, based on a length of pipeline stages between a first block and a second block in a hardware test design (e.g., length of three between LBIST macro 250 and HT Core1 261 in the test design 800 in FIG. 8), a first scan chain (e.g., scan chain 900, 1000, 1100 in FIG. 9, FIG. 10, FIG. 11)

including at least one pipeline stage of a head pipeline stage (e.g., head pipeline stage 910 in FIG. 9) or a tail pipeline stage (e.g., tail pipeline stage 990 in FIG. 9). The processor may be configured to obtain, based on analysis of a physical layout of the hardware test design (e.g., physical layout 600 in FIG. 6), the length of pipeline stages between the first block and the second block. The length may be determined by the physical distance between the 2 blocks but embodiments of the present disclosure is not limited thereto and the processor may insert an appropriate number of pipeline flops required for a given physical distance. The hardware test design may be a hierarchical test design. For example, the test design 800 is a top-level hierarchical test design. The first block may be a block for compression or LBIST (e.g., LBIST macro 250 in FIG. 8) at a first level of the hierarchical test design. The second block may be a block (e.g., HT Core1 261 in FIG. 8) at a second level of the hierarchical test design that is at the same level or at a lower than the first level. Embodiments of the present disclosure are not limited to scan pipelines optimization in a hierarchical test design, but the same optimized scan pipeline insertion techniques can be used in a design that needs scan pipelining for a single-level design with regions of scannable logic that are distant (and thus requiring pipelining) from the central LBIST/compression macro.

At step 1304, the processor of the EDA system may insert a plurality of flip-flops (e.g., flip-flops 1052, 1054, 1056 in FIG. 10) and at least one lockup element (e.g., pipeline lockup elements 1010, 1090 in FIG. 10) into the first scan chain (e.g., scan chain 900 in FIG. 9).

At step 1306, the processor of the EDA system may determine at least one first clock (e.g., head clock 1030, tail clock 1040 in FIG. 10) to be used for at least one pipeline stage (e.g., head pipeline stage 910, tail pipeline stage 990 in FIG. 9), using at least one lockup element (e.g., pipeline lockup elements 1010, 1090 in FIG. 10) and the plurality of flip-flops (e.g., flip-flops 1052, 1054, 1056 in FIG. 10). In determining at least one first clock, the processor may be configured to determine a second clock (e.g., separate pipeline clock 1020 in FIG. 10) to be used for at least one pipeline stage and at least one lockup element, and extract, from the plurality of flip-flops, at least one first clock to be used for at least one pipeline stage, using the second clock for at least one lockup element as a placeholder. In determining at least one first clock, the processor may be configured to edit clock pin connections of at least one pipeline stage using the extracted at least one first clock. The first clock may include at least one of a clock for a head flip-flop (e.g., flip-flop 1052 in FIG. 10) of the plurality of flip-flops or a clock for a tail flip-flop (e.g., flip-flop 1056 in FIG. 10) of the plurality of flip-flops.

At step 1308, the processor of the EDA system may generate, based on at least one first clock (e.g., head clock 1030, tail clock 1040 in FIG. 10), a second scan chain (e.g., final scan chain 1200) that connects at least one pipeline stage (e.g., head pipeline stage 910, tail pipeline stage 990 in FIG. 9) and the plurality of flip-flops (e.g., flip-flops 1052, 1054, 1056 in FIG. 10). The processor may be configured to delete at least one lockup element (e.g., pipeline lockup elements 1010, 1090 in FIG. 10) from the first scan chain (e.g. initial scan chain) so that the second scan chain (final scan chain) does not include at least one lockup element (see FIG. 12). The final scan chain may be free of any lockup element (see FIG. 12). The final scan chain includes the same number of pipeline stages as the length of pipeline stages between the first block and the second block.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may include RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of optimizing scan pipelining in an electronic design automation (EDA) system, the method comprising:
    generating, by a processor, based on a required length of pipeline stages between a first block and a second block in a hardware test design, a first scan chain including at least one pipeline stage of a head pipeline stage or a tail pipeline stage;
    inserting, by the processor, a plurality of flip-flops into the scan chain;
    determining, by the processor, at least one clock to be used for the at least one pipeline stage, using the plurality of flip-flops; and
    generating, by the processor, based on the at least one clock, a second scan chain that connects the at least one pipeline stage and the plurality of flip-flops.

2. The method according to claim 1, wherein
    inserting the plurality of flip-flops into the scan chain includes inserting a plurality of flip-flops and at least one lockup element into the scan chain, and
    determining the at least one clock includes determining the at least one clock using the at least one lockup element and the plurality of flip-flops.

3. The method according to claim 2, wherein determining the at least one clock includes:
    determining a second clock to be used for the at least one pipeline stage and the at least one lockup element; and
    extracting, from the plurality of flip-flops, the at least one clock to be used for the at least one pipeline stage, using the second clock for the at least one lockup element as a placeholder.

4. The method according to claim 3, wherein determining at least one clock further includes:
    editing clock pin connections of the at least one pipeline stage using the extracted at least one clock.

5. The method according to claim 2, further comprising:
    deleting, by the processor, the at least one lockup element from the first scan chain so that the second scan chain does not include the at least one lockup element.

6. The method according to claim 1, wherein the at least one clock includes at least one of a clock for a head flip-flop of the plurality of flip-flops or a clock for a tail flip-flop of the plurality of flip-flops.

7. The method according to claim 1, wherein generating the second scan chain includes:
    performing a scan chain connection between (1) the at least one pipeline stage and (2) at least one flip-flop of a head flip-flop of the plurality of flip-flops or a tail flip-flop of the plurality of flip-flops.

8. The method according to claim 1, wherein the second scan chain is free of any lockup element.

9. The method according to claim 1, wherein the second scan chain includes the same number of pipeline stages as the required length of pipeline stages between the first block and the second block.

10. The method according to claim 1, wherein
    the hardware test design is a hierarchical test design,
    the first block is a block for compression or Logic Built In Self Test at a first level of the hierarchical test design, and
    the second block is a block at a second level of the hierarchical test design that is at the same level or at a lower than the first level, and
    the required length of the pipeline stages is determined by an early physical layout analysis of the hardware test design.

11. A system for optimizing scan pipelining, comprising:
    a memory containing instructions; and
    a processor configured to execute the instructions to:
        generate, based on a required length of pipeline stages between a first block and a second block in a hardware test design, a first scan chain including at least one pipeline stage of a head pipeline stage or a tail pipeline stage;
        insert a plurality of flip-flops into the first scan chain;
        determine at least one clock to be used for the at least one pipeline stage, using the plurality of flip-flops; and
        generate, based on the at least one clock, a second scan chain that connects the at least one pipeline stage and the plurality of flip-flops.

12. The system according to claim 11, wherein
    in inserting the plurality of flip-flops into the scan chain, the processor is configured to insert a plurality of flip-flops and at least one lockup element into the scan chain, and
    in determining the at least one clock, the processor is configured to determine the at least one clock using the at least one lockup element and the plurality of flip-flops.

13. The system according to claim 12, wherein in determining the at least one clock, the processor is configured to:
    determine a second clock to be used for the at least one pipeline stage and the at least one lockup element; and
    extract, from the plurality of flip-flops, the at least one clock to be used for the at least one pipeline stage, using the second clock for the at least one lockup element as a placeholder.

14. The system according to claim 13, wherein the processor is further configured to:
    edit clock pin connections of the at least one pipeline stage using the extracted at least one clock.

15. The system according to claim 12, wherein the processor is further configured to delete the at least one lockup element from the first scan chain so that the second scan chain does not include the at least one lockup element.

16. The system according to claim 11, wherein the at least one clock include at least one of a clock for a head flip-flop of the plurality of flip-flops or a clock for a tail flip-flop of the plurality of flip-flops.

17. The system according to claim 11, wherein in generating the second scan chain, the processor is configured to:
    perform a scan chain connection between (1) the at least one pipeline stage and (2) at least one flip-flop of a head flip-flop of the plurality of flip-flops or a tail flip-flop of the plurality of flip-flops.

18. The system according to claim 11, wherein the second scan chain is free of any lockup element.

19. The system according to claim 11, wherein the second scan chain includes the same number of pipeline stages as the required length of pipeline stages between the first block and the second block.

20. The system according to claim 11, wherein
    the hardware test design is a hierarchical test design,
    the first block is a block for compression or Logic Built In Self Test at a first level of the hierarchical test design,
    the second block is a block at a second level of the hierarchical test design that is at the same level or at a lower than the first level, and
    the required length of the pipeline stages is determined by an early physical layout analysis of the hardware test designs.

* * * * *